(12) United States Patent
Mielke et al.

(10) Patent No.: US 9,086,097 B2
(45) Date of Patent: Jul. 21, 2015

(54) UNIVERSAL JOINT

(71) Applicant: GM GLOBAL TECHNOLOGY OPERATIONS LLC, Detroit, MI (US)

(72) Inventors: Christopher J. Mielke, Shelby Township, MI (US); Miroslaw Zaloga, Shelby Township, MI (US); Peter J. Judis, Rochester Hills, MI (US); Monica M. Ligerakis, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 13/683,112

(22) Filed: Nov. 21, 2012

(65) Prior Publication Data

US 2014/0140761 A1 May 22, 2014

(51) Int. Cl.
*F16B 2/02* (2006.01)
*F16D 3/16* (2006.01)
*F16D 1/08* (2006.01)
*F16D 3/38* (2006.01)

(52) U.S. Cl.
CPC ............... *F16D 3/16* (2013.01); *F16D 1/0864* (2013.01); *F16D 3/387* (2013.01); *Y10T 403/535* (2015.01); *Y10T 403/7033* (2015.01)

(58) Field of Classification Search
CPC ..... F16D 1/0852; F16D 1/0864; F16D 1/087; F16D 3/16; F16D 3/387; Y10T 403/58; Y10T 403/581; B62D 1/20
USPC ........... 403/109.6, 235, 290, 313, 319, 359.5; 464/134
See application file for complete search history.

(56) References Cited

U.S. PATENT DOCUMENTS

| | | | | |
|---|---|---|---|---|
| 3,529,344 | A * | 9/1970 | Pitner | 29/438 |
| 4,433,465 | A * | 2/1984 | Nakano et al. | 29/415 |
| 4,628,758 | A * | 12/1986 | Yuzuriha et al. | 74/498 |
| 5,018,899 | A * | 5/1991 | Kuribara et al. | 464/134 |
| 5,188,474 | A * | 2/1993 | Ohkubo et al. | 403/57 |
| 5,628,578 | A * | 5/1997 | McClanahan et al. | 403/290 |
| 6,022,047 | A * | 2/2000 | Okubo | 280/777 |
| 6,575,658 | B2 * | 6/2003 | Daniel et al. | 403/316 |
| 7,066,679 | B2 * | 6/2006 | Audibert et al. | 403/355 |
| 7,461,996 | B2 * | 12/2008 | Kinme et al. | 403/319 |
| 8,845,438 | B2 * | 9/2014 | Moriyama et al. | 464/134 |
| 2004/0091308 | A1 * | 5/2004 | Kinme et al. | 403/235 |
| 2010/0109273 | A1 * | 5/2010 | Moriyama et al. | 280/93.506 |

* cited by examiner

*Primary Examiner* — Michael P Ferguson
*Assistant Examiner* — Matthew R McMahon
(74) *Attorney, Agent, or Firm* — Quinn Law Group, PLLC

(57) ABSTRACT

A yoke for receiving a shaft includes a collar. The collar defines a shaft slot, into which the shaft may be inserted. A first pinch tab extends from the collar and has a first folded end, which is folded toward the shaft slot. A second pinch tab extends from the collar and has a second folded end, which is folded away from the shaft slot.

14 Claims, 4 Drawing Sheets

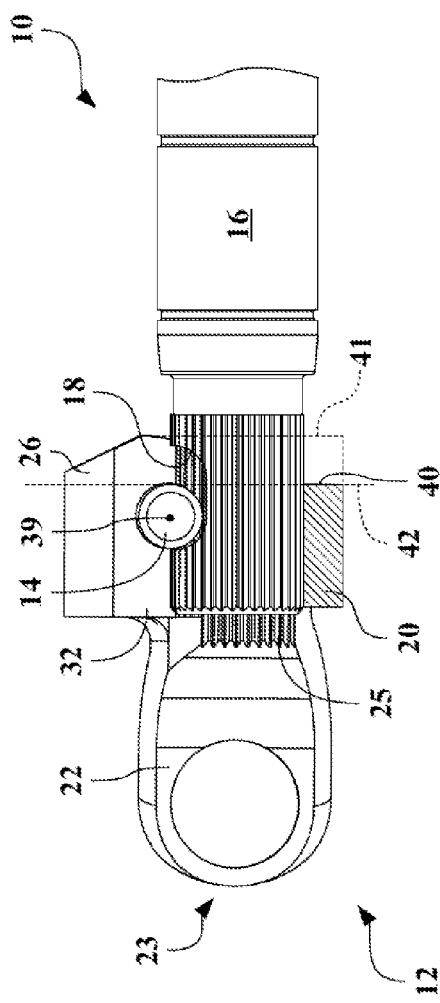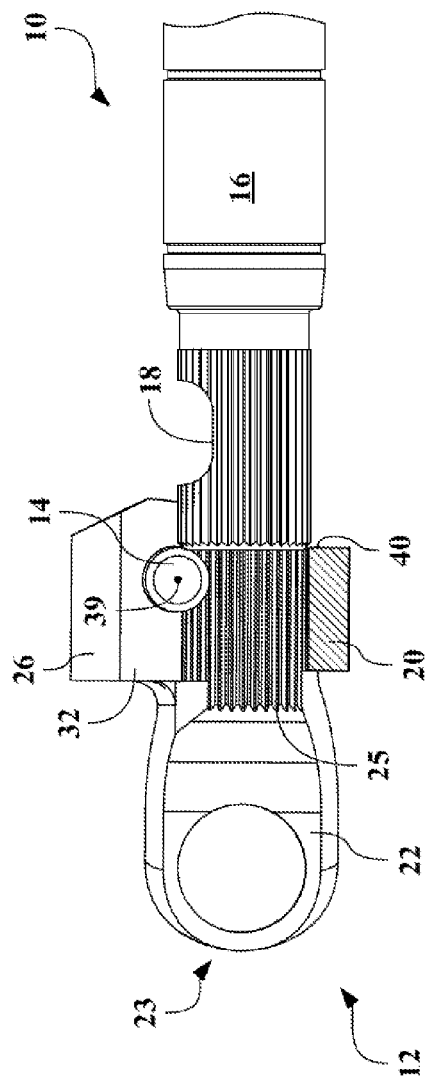

UNIVERSAL JOINT

TECHNICAL FIELD

This disclosure relates to universal joints.

BACKGROUND

Universal couplings or universal joints facilitate transfer of rotary motion between rigid structures, such as rods, having angular displacement therebetween. The universal coupling may include one or more hinges connected by a cross shaft.

SUMMARY

A yoke for receiving a shaft is provided. The yoke includes a collar and may include a pair of wings extending from the collar. A shaft slot is defined by the collar. A first pinch tab extends from the collar and has a first folded end. A second pinch tab extends from the collar and has a second folded end. The first folded end is folded toward the shaft slot. However, the second folded end is folded away from the shaft slot. The pair of wings, the collar, the first pinch tab, and the second pinch tab may be formed as a one-piece, unitary element.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 5 is a schematic, partial cross section of the universal joint of FIG. 1, taken along line 5-5; and FIG. 6 is a schematic, partial cross section similar to that shown in FIG. 5, but with the shaft only partially inserted into the yoke.

DETAILED DESCRIPTION

Figure 1:
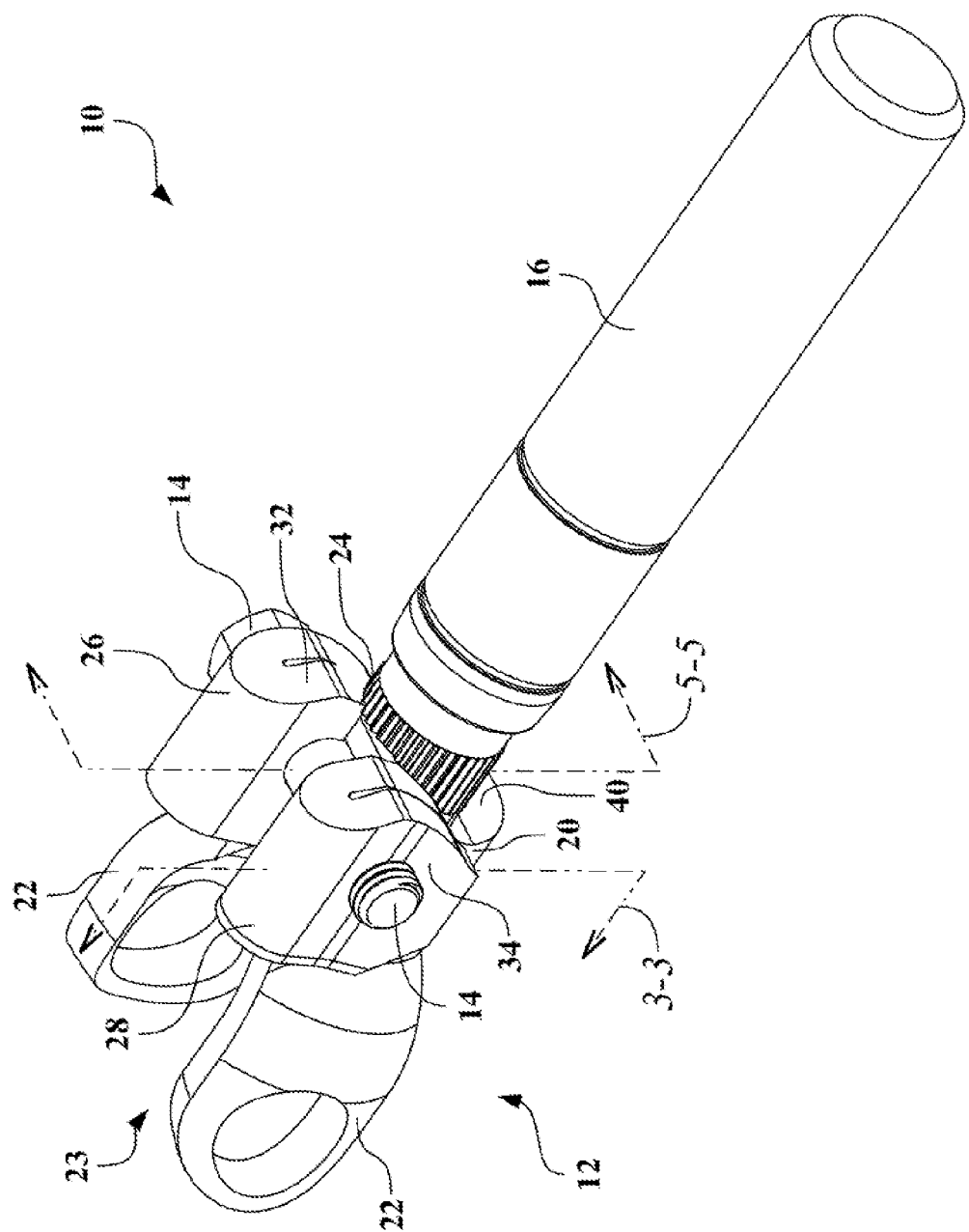
FIG. 1 is a schematic, isometric view of a universal joint.

Referring to the drawings, like reference numbers correspond to like or similar components wherever possible throughout the several figures. FIG. 1 shows an isometric view of a universal coupling or universal joint 10, which may be used to transmit rotary motion. The universal joint 10 may link to another similar joint, such as with a cross bolt (not shown) or may link to other structures.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

The universal joint 10 includes a yoke 12, a bolt or pinch bolt 14, and a shaft 16, which may be a driving shaft or a driven shaft. The pinch bolt 14 mates with the yoke 12 and is configured to retain the shaft 16 to the yoke 12. The pinch bolt 14 cooperates with a whistle notch 18 defined by the shaft 16 to hold the shaft 16 to the yoke 12. All portions of the yoke 12 may be formed from a single, unitary, one-piece stamping.

Figure 2:
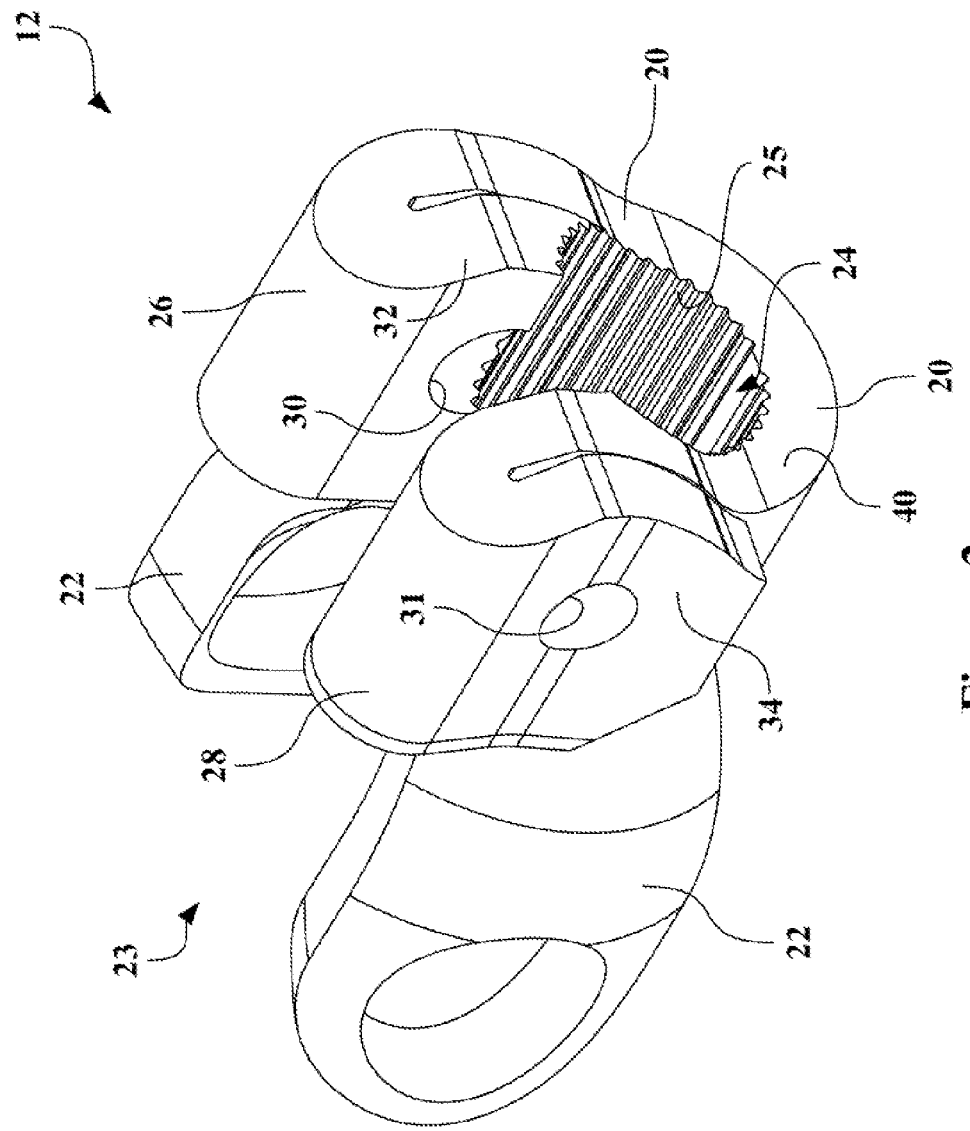
FIG. 2 is a schematic, isometric view of a yoke from the universal joint of FIG. 1.
Figure 3:
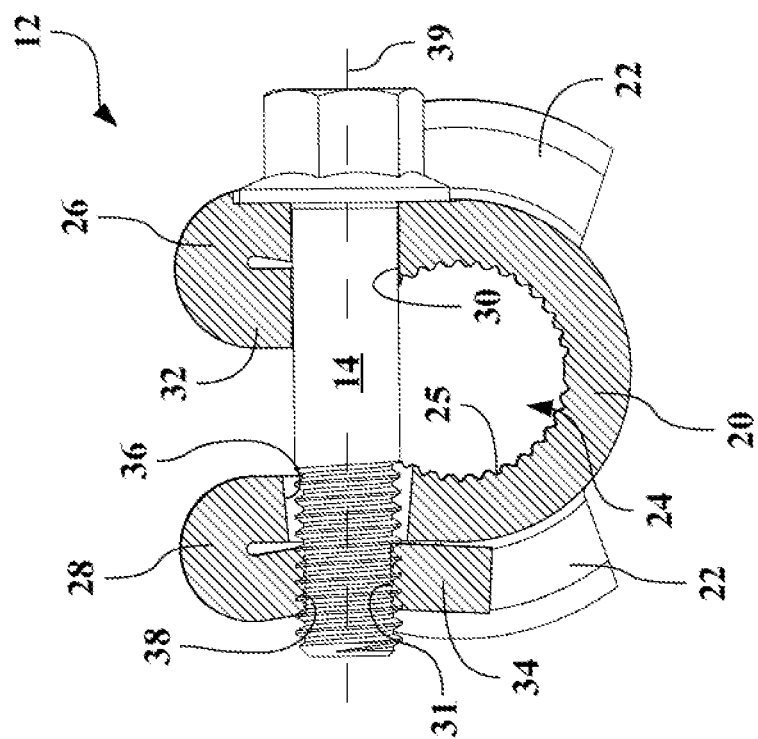
FIG. 3 is a schematic, partial cross section of the yoke and a pinch bolt taken along line 3-3 of FIG. 1.

Referring now to FIG. 2 and to FIG. 3, and with continued reference to FIG. 1, there are shown additional views of portions of the universal joint 10. FIG. 2 shows an isometric view of the yoke 12, and FIG. 3 shows a partial cross-section view of the yoke 12 and pinch bolt 14 taken along line 3-3 of FIG. 1. Note that the shaft 16 is not shown in FIG. 2 or FIG. 3.

The yoke 12 includes a collar 20 and a pair of wings 22 defining a U-shaped aperture 23 extending from the collar 20 on the opposite side of the yoke 12 from the shaft 16. The wings 22 may cooperate with one or more trunnions or pins (not shown) that are within the U-shaped aperture 23. The trunnions or pins may be attached to another joint, another yoke, or another shaft.

The collar 20 defines a shaft slot 24, into which the shaft 16 inserts or mates. The shaft slot 24 defines a splined portion 25 around the exterior of the shaft slot 24. The splined portion 25 cooperates with splines formed on the shaft 16 to transfer rotary movement between the shaft 16 and the yoke 12. The shaft slot 24 is partially open in a direction substantially perpendicular to the U-shaped aperture 23 and the trunnions or pins that would link between the wings 22. As viewed in the figures, the shaft slot 24 is open upward or vertically, and the U-shaped aperture defines space for horizontal pins.

A first pinch tab 26 extends from the collar 20 and a second pinch tab 28 extends, generally on an opposing side of the shaft slot 24, from the collar 20. The first pinch tab 26 has a first folded end 32 and the second pinch tab 28 has a second folded end 34. The first folded end 32 is folded toward the shaft slot 24, such that portions of the first folded end 32 define the splined portion 25.

The second folded end 34, unlike the first folded end 32, is folded away from the shaft slot 24. Therefore the second folded end 34 is on the exterior of the collar 20 relative to the shaft slot 24. The wings 22, the collar 20, the first pinch tab 26, and the second pinch tab 28 are formed as a one-piece, unitary element. Therefore the yoke 12 may be formed by, without limitation, stamping. Alternatively, the yoke 12 may be formed by casting or machined from billet. The yoke 12 shown may utilize post-stamping machining to form some of the final features, such as the splined portion 25.

To attach the pinch bolt 14, a first bore hole or first bore 30 is defined through the first pinch tab 26, and a second bore hole or second bore 31 is defined through the second pinch tab 28. The first bore 30 and the second bore 31 are substantially coaxial. Note, however, that the first bore 30 and the second bore 31 may not have the same diameter, and may include a counter bore 36 or may substantially match the diameter of the pinch bolt 14.

The second folded end 34 defines a threaded portion 38. In configurations with the counter bore 36, the threaded portion 38 may be beyond the counter bore 36, in the direction of insertion of the pinch bolt 14. The threaded portion 38 cooperates with the pinch bolt 14 to mate the pinch bolt 14 to the yoke 12. As shown in FIG. 3, the threaded portion 38 of the second bore 31 does not extend into the splined portion 25 of the shaft slot 24.

The pinch bolt 14 is configured to pass through the whistle notch 18 of the shaft 16 when mated to the threaded portion 38 of the second bore 31. The first bore 30 and the second bore 31 are substantially coaxial with an axis 39 of the pinch bolt 14.

Figure 4:
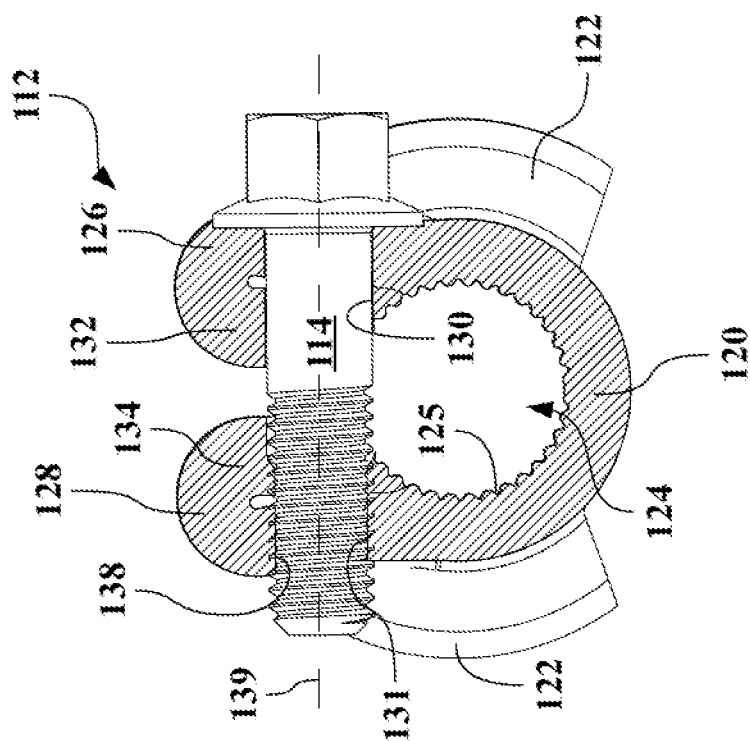
FIG. 4 is a schematic, partial cross section of an alternative yoke and pinch bolt taken along a viewpoint similar to the line 3-3 of FIG. 1.

Referring now to FIG. 4, and with continued reference to FIGS. 1-3, there is shown a cross-sectional view of another yoke 112 and pinch bolt 114, which may cooperate with a shaft (not shown) similar to the shaft 16 shown in FIG. 1. FIG. 4 is taken along a viewpoint similar to that of the line 3-3 shown in FIG. 1, such that the yoke 112 of FIG. 4 may be compared and contrasted with the yoke 12 shown in FIG. 3.

The yoke 112 includes a collar 120 and a U-shaped aperture (not separately numbered, on the opposite side of the viewpoint of FIG. 4) extending from the collar 120. A pair of wings 122 define the U-shaped aperture, which may hold a trunnion. The collar 120 defines a shaft slot 124, into which the shaft inserts or mates. The shaft slot 124 defines a splined portion 125 around the exterior of the shaft slot 124. The splined portion 125 cooperates with splines formed on the shaft to transfer rotary movement between the shaft and the yoke 112.

A first pinch tab 126 extends from the collar 120 and a second pinch tab 128 extends, generally on an opposing side of the shaft slot 124, from the collar 120. The first pinch tab 126 has a first folded end 132 and the second pinch tab 128 has a second folded end 134. The wings 122, the collar 120, the first pinch tab 126, and the second pinch tab 128 are formed as a one-piece, unitary element, and may be formed by, for example, stamping.

Like the yoke 12 shown in FIG. 3, the first folded end 132 is folded toward the shaft slot 124, such that portions of the first folded end 132 may define the splined portion 125. The second folded end 134 of the yoke 112 is also folded toward the shaft slot 124, unlike the second folded end 34 of the yoke 12. Therefore the second folded end 134 is on the interior of the collar 120 relative to the shaft slot 124.

To attach the pinch bolt 114, a first bore hole or first bore 130 is defined through the first pinch tab 126, and a second bore hole or second bore 131 is defined through the second pinch tab 128. The first bore 130 and the second bore 131 are substantially coaxial.

The second pinch tab 128 defines a threaded portion 138. The threaded portion 138 cooperates with the pinch bolt 114 to mate the pinch bolt 114 to the yoke 112. As shown in FIG. 4, the threaded portion 138 of the second bore 131 may need to extend into the splined portion 125 of the shaft slot 124 to facilitate sufficient thread engagement with the pinch bolt 114.

The pinch bolt 114 is configured to pass through a whistle notch (not shown) of the shaft when mated to the threaded portion 138 of the second bore 131. The first bore 130 and the second bore 131 are substantially coaxial with an axis 139 of the pinch bolt 114.

As shown in FIGS. 3 and 4, the axis 139 of the pinch bolt 114 in yoke 112 is relatively higher than the axis 39 of the pinch bolt 14 in the yoke 12. By having the threaded portion 38, and the second folded end 34, on the outside of the shaft slot 24, the yoke 12 lowers the pinch bolt 14. The relatively lower location of the pinch bolt 14 in the yoke 12 than the yoke 112 also allows the whistle notch 18 on the shaft 16 to be lower. As shown in FIG. 4, when the second folded end 134 folds toward the shaft slot 124, the second bore 131 has to be higher (as compared the second bore 31 of the yoke 12) to provide sufficient distance for engagement with the pinch bolt 114.

Referring now to FIG. 5 and FIG. 6, and with continued reference to FIGS. 1-4, two partial cross sectional views of the universal joint 10 are shown. FIGS. 5 and 6 are shown with the yoke 12 sectioned along line 5-5 from FIG. 1, but the pinch bolt 14 and the shaft 16 are shown whole. FIG. 5 shows the universal joint 10 fully assembled.

FIG. 6 shows the universal joint 10 when the pinch bolt 14 has been inserted prior to mating the shaft 16 to the shaft slot 24, such that the shaft 16 is not properly inserted into the shaft slot 24. During assembly, the shaft 16 must be inserted into the shaft slot 24 such that the splined portion 25 mates with splines on the shaft 16. The pinch bolt 14 may then be inserted through the first bore 30, the whistle notch 18, and the second bore 31, to lock the shaft 16 to the yoke 12.

As shown in FIGS. 5 and 6, the axis 39 of the pinch bolt 14 may be substantially coincident with a top of the shaft 16. The deep whistle notch 18 and the second folded end 34 allow the pinch bolt 14 to be lowered to the level shown.

In the universal joint 10 shown, the whistle notch 18 has a notch depth that is equal to or greater than one-half of the diameter of the pinch bolt 14. However, some configurations may not lower the pinch bolt 14 this far into the shaft 16.

The yoke 12 of the universal joint 10 includes an undercut slot 40 formed in the collar 20. The undercut slot 40 is further illustrated by a full-body line 41 in FIG. 5, which represents a portion of the collar 20 that is removed (or was never included) to form the undercut slot 40. The undercut slot 40 is formed opposite the shaft slot 24 from the first pinch tab 26 and the second pinch tab 28, and is also formed opposite to, or facing away from, the wings 22.

The undercut slot 40 removes portions of the collar 20 that would otherwise define part of the splined portion 25, as illustrated by the full-body line 41 in FIG. 5. Therefore, when the pinch bolt 14 is inserted prior to the shaft 16, as shown in FIG. 6, there is less of the shaft slot 24 and the splined portion 25 to grab and hold the shaft 16. Therefore, the undercut slot 40 reduces the chances of improper assembly of the universal joint 10.

Proper assembly of the universal joint 10 avoids the condition shown in FIG. 6, because the shaft 16 and the yoke 12 will not remain together. However, if the shaft 16 is able to partially enter the shaft slot 24, the splines on the shaft 16 may grab or bite onto the splined portion 25 and give the (incorrect) appearance or feel that the universal joint 10 is fully assembled.

The undercut slot 40 may define an undercut plane 42, which is at the nearest portion of the undercut slot 40 toward the U-shaped aperture 23 formed by the wings 22. In the configuration shown in FIGS. 5 and 6, the undercut plane 42 is substantially coincident with an edge of the first bore 30 opposite the U-shaped aperture 23. Therefore, the ability of the shaft 16 to be inserted and retained in the shaft slot 24 after the pinch bolt 14 has already been mated to the yoke 12 is further reduced.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A yoke for receiving a shaft, comprising:
   a collar;

a shaft slot defined by the collar;
a first pinch tab extending from the collar and having a first folded end, wherein the first folded end is folded toward the shaft slot;
a second pinch tab extending from the collar and having a second folded end, wherein the second folded end is folded away from the shaft slot;
a first bore defined through the first pinch tab;
a second bore defined through the second pinch tab, and substantially coaxial with the first bore, the first and second bores being configured to receive a bolt, and wherein the second folded end defines a threaded portion configured to cooperate with the bolt to mate the bolt to the yoke;
a splined portion defined around the shaft slot configured to receive a splined portion of the shaft, and
wherein the first folded end comprises a splined portion, corresponding to the splined portion of the shaft slot, configured to engage with the splined portion of the shaft.

2. The yoke of claim 1, further comprising:
an undercut slot formed in the collar opposite the shaft slot from the first pinch tab and the second pinch tab.

3. The yoke of claim 1, wherein the threaded portion of the second bore does not extend into the splined portion of the shaft slot.

4. The yoke of claim 3, wherein the first bore defines a bolt axis, which is substantially coincident with a top of the shaft when the shaft is received within the shaft slot.

5. The yoke of claim 4, further comprising:
an undercut plane defined by the undercut slot; and
a pair of wings extending from the collar opposite the undercut plane,
wherein the pair of wings, the collar, the first pinch tab, and the second pinch tab are a one-piece, unitary element,
wherein the undercut slot is substantially coincident with an edge of the first bore opposite the pair of wings.

6. A universal joint, comprising:
a shaft, having a whistle notch and a splined portion;
a yoke, including:
a collar;
a pair of wings extending from the collar and defining a U-shaped aperture;
a shaft slot defined by the collar, a splined portion defined around the shaft slot configured to receive the splined portion of the shaft;
a first pinch tab extending from the collar and having a first folded end, wherein the first folded end is folded toward the shaft slot and comprises a splined portion corresponding to the splined portion of the shaft slot and configured to engage a portion of the splined portion of the shaft;
a second pinch tab extending from the collar and having a second folded end, wherein the second folded end is folded away from the shaft slot, and the pair of wings, the collar, the first pinch tab, and the second pinch tab are a one-piece, unitary element;
a first bore defined through the first pinch tab; and
a second bore defined through the second pinch tab and substantially coaxial with the first bore, wherein the second folded end defines a threaded portion;
a bolt configured to pass through the first bore and the whistle notch of the shaft and to mate with the threaded portion of the second bore to mate the bolt to the yoke.

7. The universal joint of claim 6, further comprising:
an undercut slot formed in the collar opposite the shaft slot from the first pinch tab and the second pinch tab and facing away from the U-shaped aperture defined by the pair of wings.

8. The universal joint of claim 7,
wherein the first bore defines a bolt diameter, and
wherein the whistle notch defines a notch depth, which is equal to or greater than one-half of the bolt diameter.

9. The universal joint of claim 8, wherein the undercut slot defines an undercut plane, which is substantially coincident with an edge of the first bore opposite the pair of wings.

10. The yoke of claim 9, wherein the first bore defines a bolt axis which is substantially coincident with a top of the shaft in the shaft slot.

11. A yoke for receiving a shaft in cooperation with a bolt, the yoke comprising:
a collar;
a pair of wings extending from the collar;
a shaft slot defined by the collar, a splined portion defined around the shaft slot configured to receive a splined portion of the shaft;
a first pinch tab extending from the collar and having a first folded end, wherein the first folded end is folded toward the shaft slot and comprises a splined portion corresponding to the splined portion of the shaft slot and configured to engage a portion of the splined portion of the shaft; and
a first bore defined through the first pinch tab; and
a second pinch tab extending from the collar and having a second folded end, wherein the second folded end is folded away from the shaft slot; and
a second bore defined through the second pinch tab, and substantially coaxial with the first bore, the first and second bores being configured to receive a bolt, and wherein the second folded end defines a threaded portion of the second bore configured to cooperate with the bolt to mate the bolt to the yoke.

12. The yoke of claim 11, wherein the pair of wings, the collar, the first pinch tab, and the second pinch tab are a one-piece, unitary element.

13. The yoke of claim 12, further comprising:
an undercut slot formed in the collar opposite the shaft slot from the first pinch tab and the second pinch tab.

14. The yoke of claim 13, wherein the first bore defines a bolt axis which is substantially coincident with a top of the shaft when the shaft is received within the shaft slot.

* * * * *